United States Patent [19]

Oba

[11] Patent Number: 4,602,880

[45] Date of Patent: Jul. 29, 1986

[54] DOT PRINTING DEVICE

[75] Inventor: Ryozo Oba, Susono, Japan

[73] Assignee: Tokyo Electric Co., Ltd., Tokyo, Japan

[21] Appl. No.: 691,263

[22] Filed: Jan. 14, 1985

[30] Foreign Application Priority Data

Jan. 24, 1984 [JP] Japan .................................. 59-11551

[51] Int. Cl.[4] .............................................. B41J 3/12
[52] U.S. Cl. .................................... 400/121; 400/303; 400/124; 400/304
[58] Field of Search ............... 400/121, 124, 303, 304, 400/174, 175; 101/93.04, 93.05

[56] References Cited

U.S. PATENT DOCUMENTS 3,521,293  7/1970  Haas ....................................... 346/74
4,071,130  1/1978  Lichti .................................... 400/124
4,159,882  7/1979  Sanders ................................. 400/124

FOREIGN PATENT DOCUMENTS 0039796  4/1981  Fed. Rep. of Germany ...... 400/319

Primary Examiner—Paul T. Sewell
Attorney, Agent, or Firm—Frishauf, Holtz, Goodman & Woodward

[57] ABSTRACT

A dot printing device includes a head having a plurality of head pins, a dot driver for selectively energizing the head pins according to dot data, a character generator, and a data processing unit for causing N-bit dot data constituting designated character data to be generated sequentially by the character generator according to input character designation data, and supplied to the head driver. The data processing unit causes a plurality of N-bit dot data corresponding to the input character designation data to be generated from the character generator according to input character designation data and italic printing data, and supplies the lower bit of the N-bit dot data and (N−1) bits with predetermined delay times with respect to the lowest bit to the head driver.

6 Claims, 62 Drawing Figures

FIG. 3
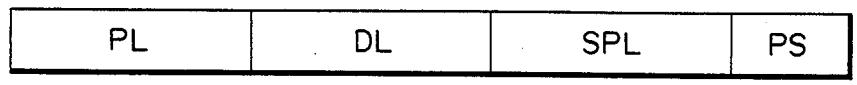
FIG. 4
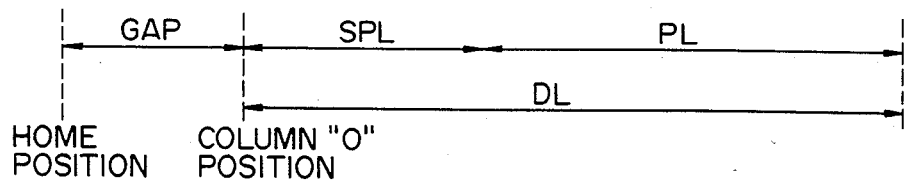
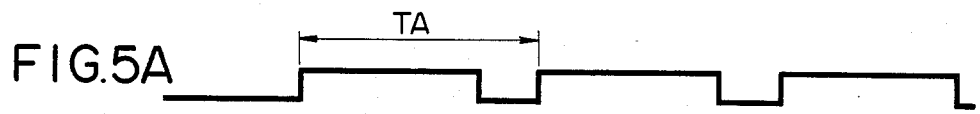

FIG. 7

| PRE1 | PRE2 | PRE3 | PRE4 | DATA | PRE1 | PRE2 | PRE3 | PRE4 | DATA | EM | EM | EM | EM | EM |
|---|---|---|---|---|---|---|---|---|---|---|---|---|---|---|

↳ TOP ADDRESS POSITION

AND ADDRESS POSITION ↲

FIG. 8

PRE 1  0 0 0 0 0 0 0
PRE 2  0 0 0 0 0 0 0
PRE 3  0 0 0 0 0 0 0
PRE 4  0 0 0 0 0 1 0
DATA   [j] ~ [t]
EM     { 0 0 0 0 0 0 0    0 0 0 0 0 0 0 }

FIG. 9

PRE 1  0 0 0 0 0 0 0
PRE 2  0 0 0 0 0 0 0
PRE 3  0 0 0 1 0 0 0
PRE 4  0 0 0 0 0 1 0
DATA   [j] ~ [t]
EM     { 0 0 0 0 0 0 0    0 0 0 0 0 0 0 }

FIG. 13A  FIG. 13B
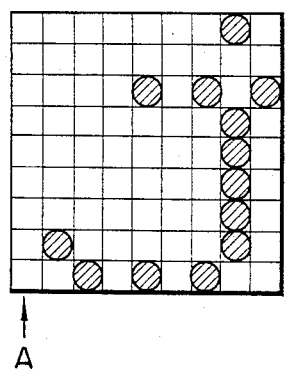
↑
A
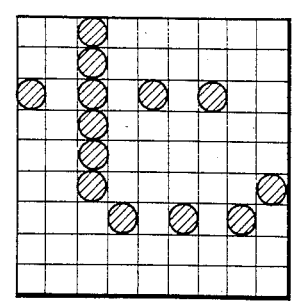
↑
B
FIG. 14
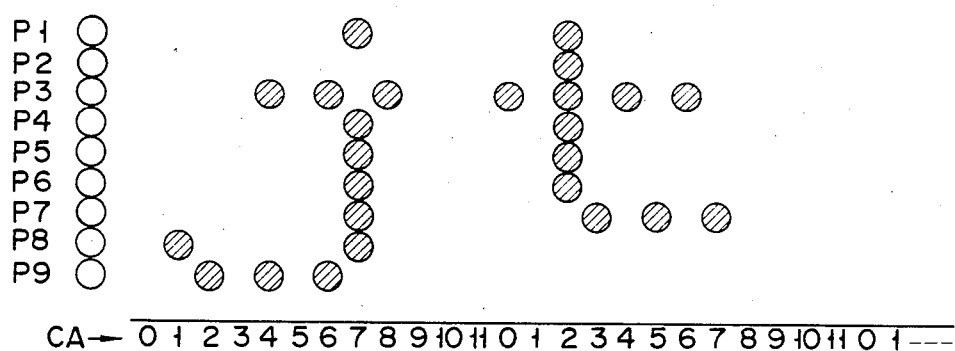

|  | BIT POSITION |
|---|---|
|  | 0 1 2 3 4 5 6 7 |
| FIG. 17A | 0 0 0 0 0 0 0 0 |
| FIG. 17B | 0 0 0 0 0 0 0 0 |
| FIG. 17C | 0 0 0 0 0 0 0 1 |
| FIG. 17D | 0 0 0 0 0 0 0 0 |
| FIG. 17E | 0 0 0 0 0 0 0 0 |
| FIG. 17F | 0 0 1 0 0 0 0 0 |
| FIG. 17G | 0 0 0 0 0 0 0 0 |
| FIG. 17H | 0 0 1 0 0 0 0 0 |
| FIG. 17I | 1 0 0 1 1 1 1 1 |
| FIG. 17J | 0 0 1 0 0 0 0 0 |

FIG.19A — FIG.19I

FIG. 22
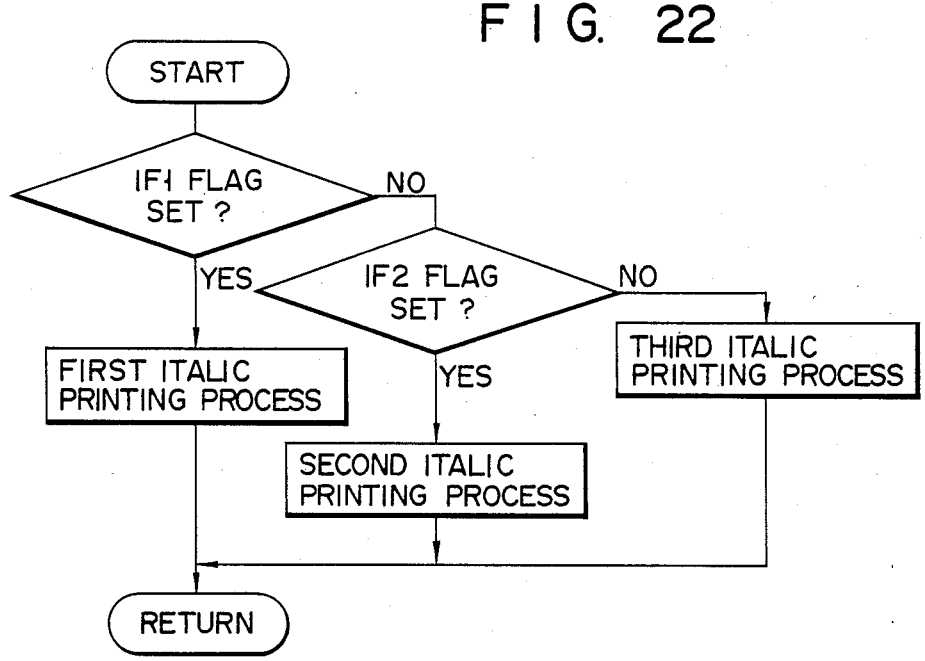
FIG. 23A  FIG. 23B  FIG. 23C
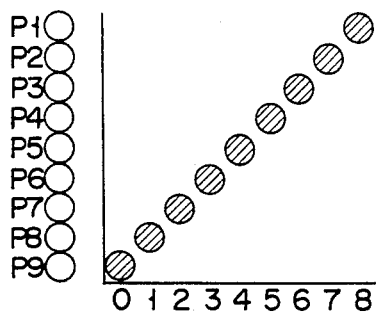 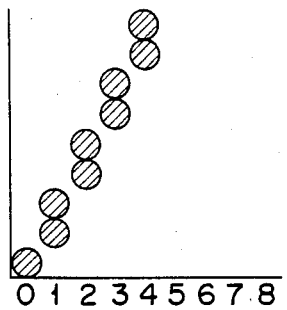 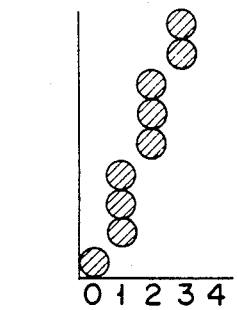

DOT PRINTING DEVICE

BACKGROUND OF THE INVENTION

This invention relates to a dot printing device having a function of printing italic characters.

The printing head of a dot printing device generally has N head pins arranged in a row. During printing, these head pins are moved at a contant speed in a direction perpendicular to the direction of the row and also selectively energized according to dot data corresponding to characters to be printed by a character generator. Sometimes, some of the characters to be printed are printed in the italic form to signify phrases to be noted or foreign language words. In the prior art, the memory capacity of the character generator has to be increased in order to permit generation of italic characters from the character generator. In this case, the italic characters are confined to 9-dot by 9-column character size, so that the shape of printed italic characters is rather inferior. In addition, an inclined line cannot be printed as a straight line.

SUMMARY OF THE INVENTION

An object of the invention is to provide a dot printing device, in which ordinary character data generated from the character generator can be processed for printing in the italic form.

To attain the above object of the invention, there is provided a dot printing device which comprises a head having N dot printing elements arranged in a row; a dot driver for selectively energizing the dot printing elements according to dot data; and a data processor for supplying a plurality of dot data constituting character data designated by input character designation data to the head driver for each printing cycle in an ordinary printing mode, while generating a plurality of dot data constituting character data designated by input character designation data, each dot data setting the operation state of each of said N dot printing elements, dividing N bits constituting each of the dot data into (n≦N) groups and supplying the n bit groups sequentially to the head driving means in n successive cycles.

BRIEF DESCRITPION OF THE DRAWINGS

FIG. 3 is a view showing the data format of printing data;

FIG. 4 is a view showing the relation among space length data, print length data and data length data;

FIGS. 5A to 5E are signal waveform diagrams for explaining the timings of transfer of data from a master CPU to a slave CPU used in the dot printing device shown in FIG. 1;

FIG. 7 is a view showing data edited in an editing routine shown in FIG. 6;

FIGS. 8 and 9 are views showing edited data for printing ordinary characters and italic characters;

FIGS. 13A and 13B are views showing dot data corresponding to character data "j" and "t";

FIG. 14 is a view showing an example of print of ordinary character data "j" and "t";

FIGS. 17A to 17J are views illustrating dot data stored in a B-register in each printing cycle;

FIGS. 19A to 19I are views showing dot data stored in an italic data buffer in each printing cycle;

FIG. 22 is a flow chart illustrating an operation of selecting first to third italic printing processes according to inclination selection data;

FIGS. 23A to 23C show first to third italic printing processes;

DETAILED DESCRIPTION OF THE PREFERRED EMBODIMENT

Figure 1:
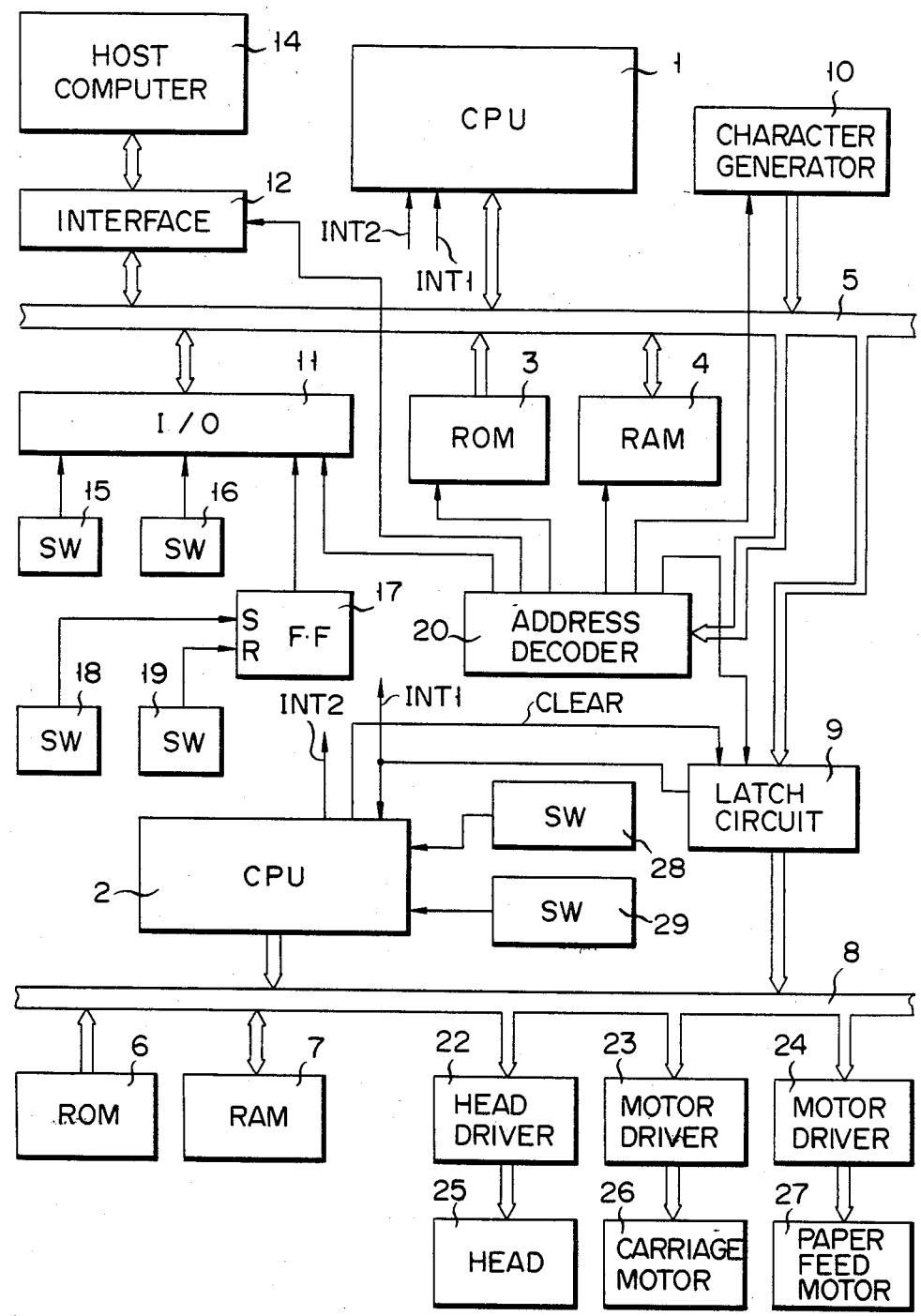
FIG. 1 is a block diagram showing a dot printing device embodying the invention.

FIG. 1 is a block diagram showing an embodiment of the dot printing device according to the invention. The illustrated circuit includes a master CPU 1 and a slave CPU 2. A read only memory (ROM) 3 and a random access memory (RAM) 4 are connected to the CPU 1 via an address and data bus. A ROM 6 and a RAM 7 are connected to the CPU 2 via a data bus 8. A data latch circuit 9 is provided for the address and data bus 5 and data bus 8. A character generator 10, an address decoder 20, an I/O port 11 and an interface 12 are provided for the CPU 1. A host computer 14 is connected to the CPU 1 via the interface 12. A line feed switch 15, a form feed switch 16 and a flip-flop 17 are connected to the CPU 1 via the I/O port 11. An on-line switch 18 and an off-line switch 19 are connected to respective set and reset terminals of the flip-flop 17. An address decoder 20 is connected to the address and data bus 5, and either the ROM 3, RAM 4, latch circuit 9, character generator 10, I/O port 11 or interface 12 is selectively energized according to an address from the CPU 1.

A head driver 22 and motor drivers 23 and 24 are connected to the CPU 2 via the data bus 8. The head driver 22 and motor drivers 23 and 24 are used to drive a printing head 25 having nine pins, for instance, a carriage motor 26 and an upper feed motor 27, respectively. A home position switch 28 and a right position switch 29 are connected to the CPU 2.

Figure 2:
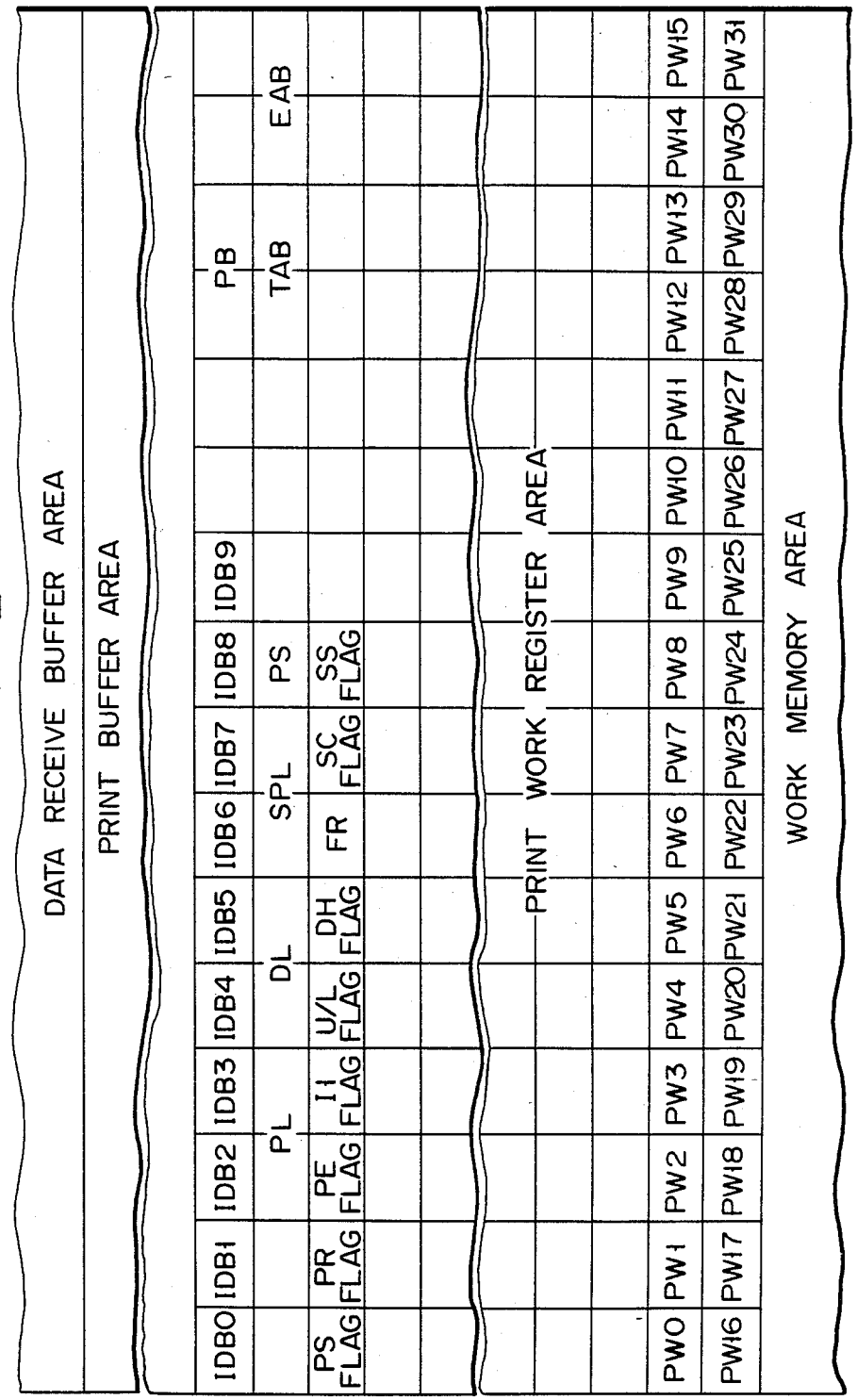
FIG. 2 is a view showing the memory map of a RAM used for the dot printing device shown in FIG. 2.

The RAM 4, as shown in FIG. 2, has a data receive buffer area, a print buffer area, a print work register area and a work memory area.

The CPU 1 transfers character data to the latch circuit 9 according to a command from the host computer 14. When the character data is latched in it, the latch circuit 9 transfers an interrupt signal INT1 to the CPUs 1 and 2. In response to the leading edge of the interrupt signal INT1, the CPU 2 reads out character data from the latch circuit 9 and then generates a clear signal to clear the latch circuit 9.

The data transferred from the CPU 1 to the CPU 2 via the latch circuit 9 includes motor drive data about a slow-up constant, a slow-down constant and a speed pattern which are necessary for driving the stepping motors 26 and 27, distance data representing the distance from the home position switch 28 to a column "0" position and time data representing the time of energization of the head 25 as well as printing information, printing data and feed data. The constant data are transferred from the CPU 1 to the CPU 2 in an initialization step after the closure of the power source.

The printing information, as shown in FIG. 3, includes print length data PL, data length data DL, space length data SPL and printing speed data PS. The printing speed data PS is a one-byte data representing the speed of printing and direction of printing. It represents speeds of 10, 12 and 16.7 cpi when its lower two-bit data is "01", "10" and "11" respectively. Also it represents a rightward printing direction and a leftward printing direction when its fourth bit position is "0" and "1" respectively. As shown in FIG. 4, the space length data SPL represents the distance from the column "0" position to a start position, from which the printing data is printed. The print data PL represents the length of printing of the printing data, and the data length data DL represents the distance of movement of the carriage, which is equal to the sum of the distances SPL and PL. Actually, the distance of movement of the carriage includes a distance necessary for slow-up and slow-down operations. The data SPL and DL are two-byte data and are transferred together with one-byte data PS to the CPU 2 for controlling the carriage motor 26.

The printing data includes preinformation data of one-byte and dot data of one byte. The preinformation data is stored in the print work register PW14 in the print work register area in the RAM 4, and the dot data is stored in the print work register PW15. The print work registers PW14 and PW15 are 8-bit registers. The CPU 2 controls upper eight pins P1 to P8 among nine pins of the head 25, and it also controls the lowermost pin P9 of the head 25 according to the bit in a "3" bit position of the print work register PW14.

The feed data includes data representing the direction and distance of feed of paper. The feed distance is set to, for instance, a feed pulse number/144 inch. This feed data is stored in the feed register FR of the RAM 4. Feed pulse number data is stored in the "0" to "5" bit positions of the feed register FR, and data concerning the feed direction is stored in the "6" bit position.

A case will now be considered where paper is fed forwardly by 1/6 inch with an operation of the line feed switch 15. In this case, the CPU 1 detects the operation of the line feed switch 15, and writes pulse number data "24" representing 1/6 inch in the latch circuit 9. The CPU 2 reads out the feed pulse number data "24" from the latch circuit 9 and transfers 24 feed pulses to the paper feed motor 27 for forwardly feeding paper by 24/144=1/6 inch.

FIGS. 5A to 5E illustrate the timing of transfer of print data to the CPU 2. In this example, it is assumed that SPL=0 and DL=PL. Before the transfer of the print data, the CPU 1 transfers dummy data DD to the latch circuit 9 as shown in FIG. 5D. When the dummy data DD is stored, the latch circuit 9 generates an interrupt signal INT1 as shown in FIG. 5B. After the data stored in the latch circuit 9 is read out, the CPU 2 generates a clear signal shown in FIG. 5C in response to the rising of the interrupt signal INT1 from the latch circuit 9, thus clearing the content of the latch circuit 9. The CPU 2 generates an interrupt signal INT2 shown in FIG. 5A after the lapse of a predetermined period of time from the generation of the dummy data DD. Subsequently, in response to the falling of the interrupt signal INT1, the CPU 1 reads out dot data from the character generator 10 according to the data stored in the print buffer area and stores the read-out data in the print work registers PW14 and PW15. Then it reads out preinformation data from the print work register PW14 and transfers it to the latch circuit 9. The CPU 1 reads the preinformation data into the RAM 7 in the manner as described. Then, it clears the content of the latch circuit 9 and sets the interrupt signal INT1 to a high level. After this, when the interrupt signal INT1 falls within a period TA of the interrupt signal INT2, the CPU 1 reads out the dot data from the print work register PW15 and transfers it to the latch circuit 9. The CPU 2 reads out the dot data form the latch circuit 9 into the RAM 7. Subsequently, the CPU 2 generates the next interrupt signal INT2, and transfers the preinformation data and dot data stored in the RAM 7 to the head driver 22 at the timing shown in FIG. 5E, whereby the pins P1 to P9 are selectively energized according to the preinformation data and dot data.

Figure 6:
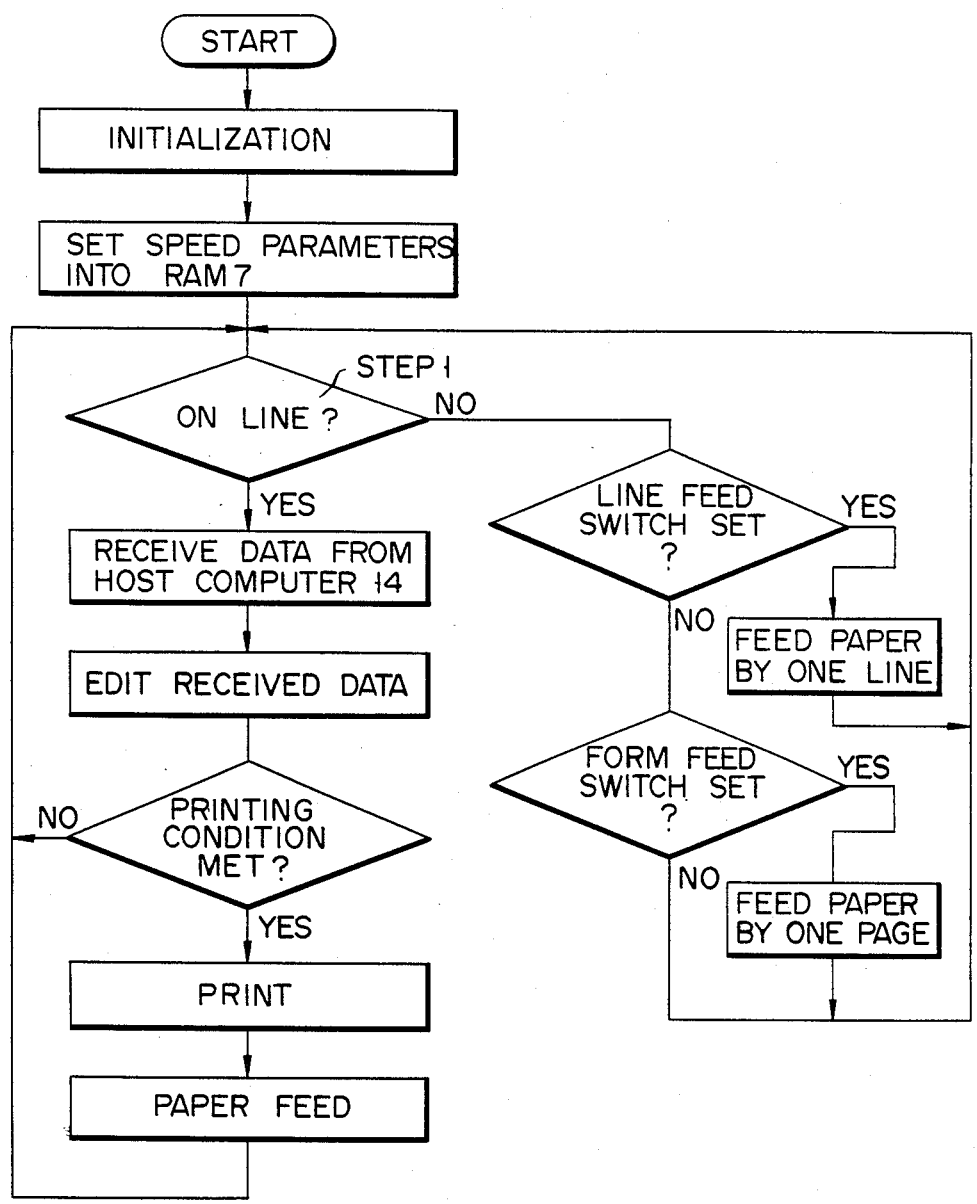
FIG. 6 is a flow chart showing a basic program routine of the master CPU and slave CPU used in the dot printing device shown in FIG. 1.

FIG. 6 is a flow chart illustrating the basic program routine of the CPUs 1 and 2. After the start, i.e., turn-ON of the power source, the device is initialized, e.g., the RAMs 4 and 7 are cleared. Then, the CPU 2 sets speed data slow-up and slow-down constant speed parameters for the carriage motor 26 into the RAM 7. Then, STEP 1 is executed, in which a check is made to see whether it is the ON-line switch or the OFF-line switch 19 that is set. If it is detected that the ON-line switch 18 is set, the CPU 1 receives data from the host computer 14. Then it edits the received data according to a data edit routine. Then it is checked whether a printing condition is met. If it is met, printing on printing paper is executed according to a printing routine. Then the paper is fed according to a paper feed routine.

If it is detected in STEP 1 that the OFF-line switch 19 is set, the CPU 1 checks whether the line feed switch 15 or the form feed switch 16 is set. If it is detected that the switch 15 or 16 is set, the paper is fed for one line or for one page.

FIG. 7 shows a format of data-edited in the edit routine shown in FIG. 6. The edited data is stored in a print buffer area of the RAM 4 that is defined by the top and end addresses stored in top and end address buffer registers TAB and EAB in the print work register area in the RAM 4. As is shown in FIG. 7, the edited data is the data for one line including a plurality of data groups, each of which includes four preinformation data PRE1 to PRE4 and character data, and four end mark data EM representing the end of data. The preinformation data PRE1 to PRE4 are one-byte data. The preinformation data PRE1 includes, for instance in "0", "1", "2" and "4" bit positions, bit data respectively representing bold printing, elongation printing, underline printing and double printing (i.e., printing of the same data twice along the same print line). The preinformation data PRE2 represents the kind of character, i.e., US ASCII, British, German, French, etc., by three-bit data at the "0" to "2" bit positions and also designates the character format, i.e., standard ASCII, near letter quality (NLQ) [proportional], NLQ [monospaced], block by two-bit data at the "4" and "5" bit positions. The preinformation data PRE3 designates the character form, i.e., subscript, superscript, double height, italic, etc., at the "0", "1", "2" and "3" bit positions. The preinformation data PRE4 represents the number of the following character data.

When printing the two standard ASCII characters "j" and "t", data "00000000", "00000000", "00000000" and "00000010" are set as the respective preinformation data PRE1 to PRE4. In the preinformation data PRE2, data "000" at the "0" to "2" bit positions represent US ASCII, and data "00" at the "4" and "5" bit positions represents standard ASCII. The preinformation data PRE4 of "00000010" represents the length of two characters. When printing the two standard ASCII characters "j" and "t" in italic form, data "00000000", "00000000", "00001000" and "00000010" are set as the respective preinformation data PRE1 to PRE4. In this case, data "1" at the "3" bit position of the preinformation data PRE3 represents the italic printing. In either case, the edited data ends with the four end mark data EM.

When the editing of data as described is completed, the printing condition is met, so that the printing routine is executed.

The printing routine will now be described in detail with reference to FIG. 10. First, CPU 1 checks in STEP 10 whether a speed change (SC) flag is set in the RAM 4. If it is detected that the SC flag is set, the CPU 1 checks in STEP 11 whether a slow speed (SS) flag is set. If it is detected that the SS flag is set, the CPU 1 supplies the low speed parameter to the CPU 2 through the latch circuit 9, and the low speed parameter is stored in the RAM 7. If, on the other hand, it is detected in STEP 11 that the SS flag is not set, the CPU 1 supplies the high speed parameter to the CPU 2 which in turn stores the high speed parameter in the RAM 7. Then, the printing subroutine is effected. The printing subroutine is also effected immediately after it is detected in STEP 10 that the SC flag is not set.

The processing effected before the printing subroutine is started is required when the italic printing is effected. In a case where the italic printing is effected, the period TA of the interrupt signal INT2 shown in FIG. 5A is extended to lower the printing speed. In particular, where proportional characters of NLQ are printed, it is necessary to lower the printing speed since it takes a relatively long time to calculate the address representing the proportional position. Therefore, when it is required to effect NLQ proportional printing in the data editing routine, that is, when data in the "4" and "5" bit positions of the preinformation data PRE2 are "0" and "1", the CPU 1 sets the SC flag and SS flag. Further, when the NLQ proportional printing is completed, the CPU 1 resets the SS flag without resetting the SC flag so that the high speed parameter is set in the RAM 7.

In the printing subroutine, the CPU 1 sets data indicating the italic data buffer IDB9 into the pointer buffer PB, and clears the contents of the italic data buffers IDB1 to IDB9. Next, the print work registers PW0 to PW31 are cleared. Then, the CPU 1 reads out data PL, DL, SPL and PS and transfers these data to the CPU 2. The CPU 1 then sets the PS flag, and then it sends dummy data and printing data to the latch circuit 9. The CPU 2 thus starts the printing operation. The CPU 1 takes out printing data from the host computer 14 and transfers it to the CPU 2 until it is detected in STEP 10 that a print end (PE) flag is set. When the CPU 1 receives an interrupt signal INT1 or INT2 while it is transferring printing data to the CPU 2, it executes an interruption routine shown in FIGS. 11A, 11B and 12 in response to the rising of the interrupt signal. The printing operation is ended when the PE flag is set in the interruption routine shown in FIG. 12.

After the end of the printing operation, the CPU 1 checks in STEP 13 whether the printing operation was the double height character printing. If it is detected that the operation was the double height character printing, a check is made in STEP 14 to see if an upper/lower (U/L) flag is set. If the U/L flag is set, the CPU 1 resets the flag, while it sets the flag if it is detected that the flag is reset.

Figure 10:
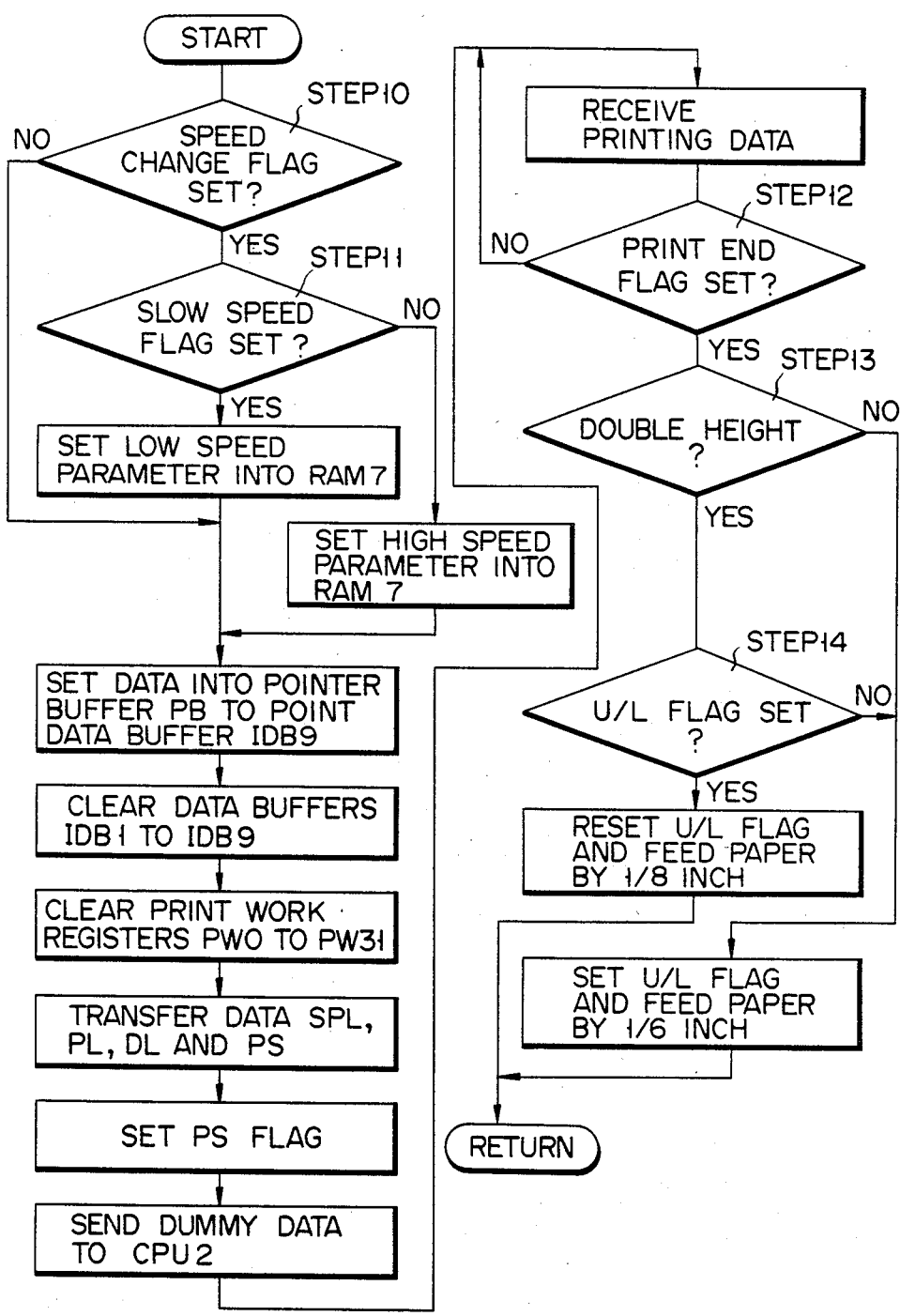
FIG. 10 is a flow chart showing a printing routine.
Figure 11A:
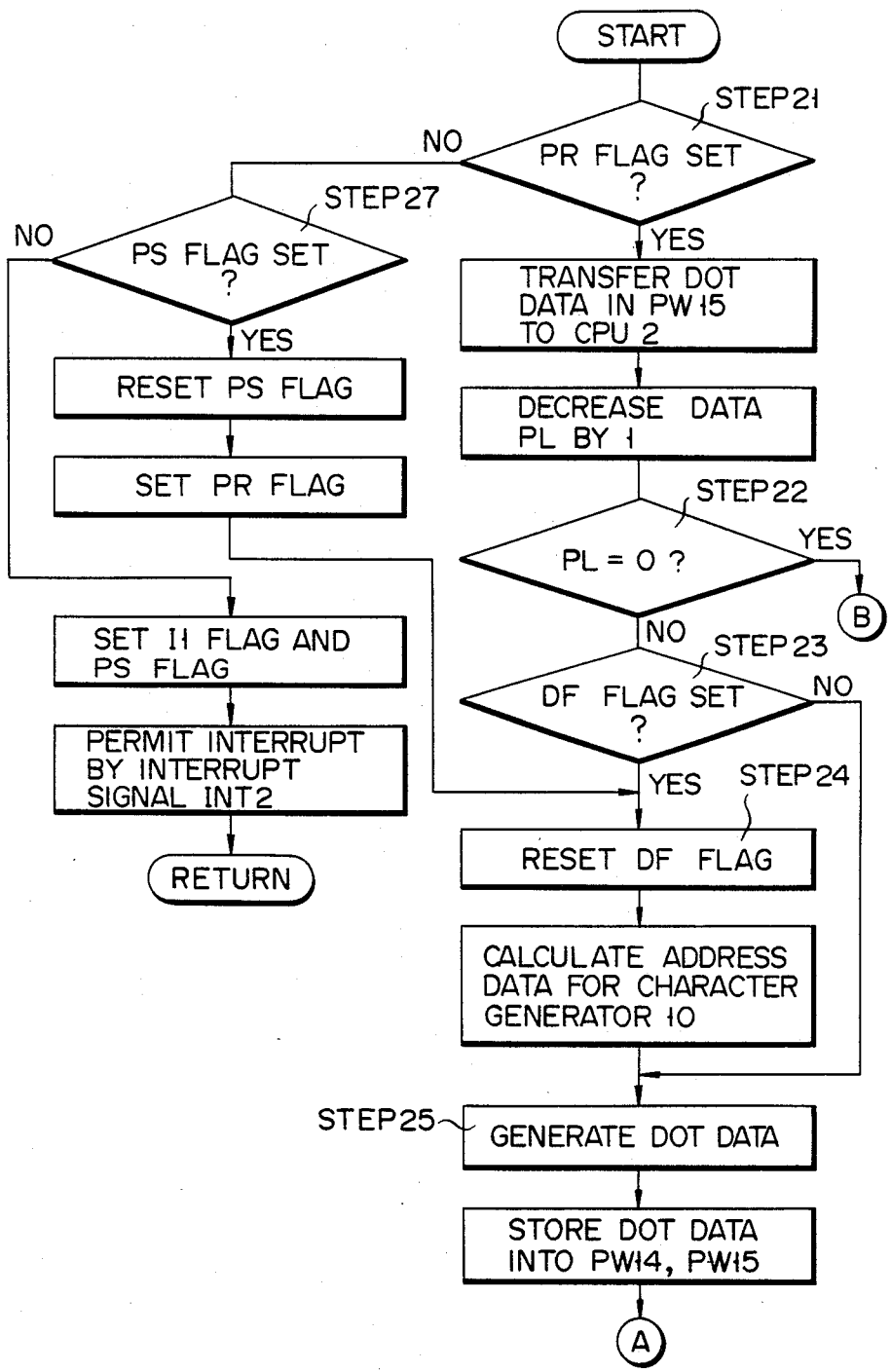
FIGS. 11A and 11B are flow charts showing a routine of interruption of the master CPU.
Figure 11B:
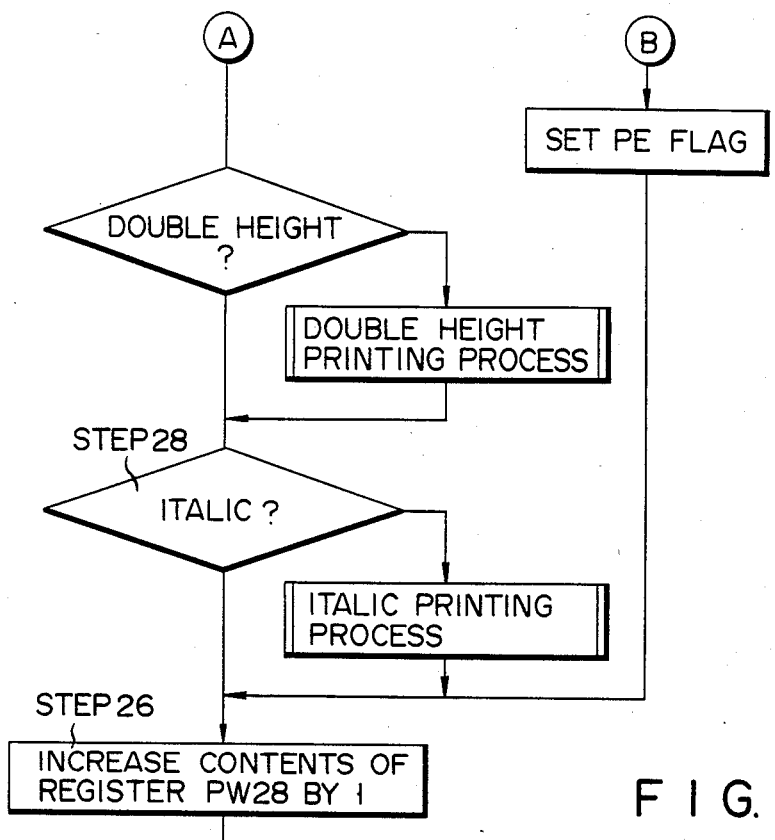

The CPU 1 executes the interruption routine as shown in FIGS. 11A and 11B in response to an interrupt signal INT1 which is generated from the CPU 2 receiving the dummy data in the printing routine shown in FIG. 10.

First, CPU 1 executes STEP 21 to check whether a print (PR) flag is set. If it is detected that the PR flag is set, the CPU 1 transfers the dot data in the print work register PW15 to the CPU 2, and then it decreases the print length data PL by 1. Then it executes STEP 22 to check whether the data PL is 0 or not. If the data PL is not 0, the CPU 1 executes STEP 23 to check whether a data fetch (DF) flag is set in the print work register PW21. If it is detected that the DF flag is set, the CPU 1 resets the DF flag. Then it calculates address data for reading out dot data from the character generator 10 according to the edited data stored in the print buffer register. Subsequently, the dot data for one line read out from the character generator 10 is stored in the print work registers PW14 and PW15. Then, it is checked whether printing is to be done by double height character printing, and it is also checked whether the printing is to be done in the italic form. The double height printing process and italic printing process are executed depending on the results of the checks. In a subsequent STEP 26, the content of the print work register PW28 representing a column position is increased by 1, and then the content of the print work register PW27 representing the length of underline is increased by 1. Then, the CPU permits interruption by the interrupt signal INT2 from the CPU 2.

If it is detected in STEP 23 of the next printing cycle that the DF flag is not set, STEP 25 is immediately executed without calculation of the address data for the character generator 10. If it is detected in STEP 22 that the data PL is 0, the CPU 1 sets the PE flag, and then executes STEP 26. If it is detectd in STEP 21 that the PR flag is not set, the CPU 1 executes STEP 27 to check whether the PS flag is set. If it is detected that the PS flag is not set, the CPU 1 sets the I1 flag, and then permits interruption by the interrupt signal INT2 from the CPU 2. If it is detected in STEP 27 that the PS flag is set, the CPU 1 resets the PS flag, then sets the PR flag, and then executes STEP 24.

The DF flag is set for every character change. For example, when the characters "j" and "t" shown in FIG. 8 or 9 are to be generated from the character generator 10, the first addresses of the characters "j" and "t" are stored in the print work registers PW8 and PW9 according to the edited data stored in the print buffer area. This means that address data for designating the dot data in the columns shown by arrows A and B in FIGS. 13A and 13B are stored in the print work registers PW8 and PW9. Then, the number of interruptions by the interrupt signal INT1 is stored in the print work register PW28 which serves as a column counter. Thus, in order to generate the next dot data from the character generator 10, the sum data (IA+CA) of the inherent address data IA stored in the print work registers PW8 and PW9 and column address data CA stored in the print work register PW28 is transferred as address data to the character generator 10. The dot data thus generated from the character generator 10 is stored in the print work register PW15.

Now, the operation will be described in connection with a case where the characters "j" and "t" are printed continuously with the head 22 moved at a speed of, for instance, 10 cpi according to the edited data as shown in FIG. 8.

Figure 12:
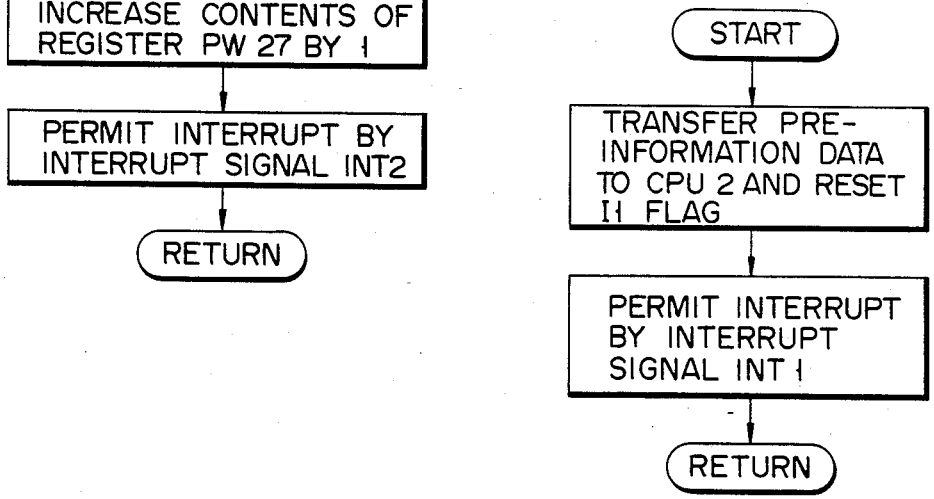
FIG. 12 is a flow chart showing a separate routine of interruption of the master CPU.

When the CPU 1 generates dummy data from the CPU 1 in the flow chart shown in FIG. 10, an interrupt signal INT1 is transferred from the CPU 2 to the CPU 1, whereby the routine shown in FIGS. 11A and 11B is executed. In this case, both the PR flag and PS flag have been reset, so that the CPU 1 sets the I1 flag and then permits interruption by the interrupt signal INT2 from the CPU 2. In response to the interrupt signal INT2 the CPU 1 transfers the preinformation data stored in the print work register PW14 to the CPU 2 and rests the I1 flag, and then it permits interruption by the interrupt signal INT1 from the CPU 2, as shown in FIG. 12. When the interrupt signal INT1 is subsequently generated from the CPU 2, the CPU 1 executes the routine shown in FIGS. 11A and 11B in response to this interrupt signal INT1. Since in this case the PS flag has been set, the CPU 1 sets the PR flag, then resets the DF flag, and then it calculates the first address data of the character data "j" according to the preinformation data PRE1 to PRE4 shown in FIG. 7 and character data "j" as described before. Corresponding 8-bit data is thus generated from the character generator 10 and stored in the print work register PW15. If the CPU 1 detects in this case that the DH flag is reset, that the UL flag is set and that the underline count data stored in the print work register PW27 represents an even number, it sets data "1" at the "3" bit position of the print work register PW14. Then, the CPU 1 increases the contents of the print work registers PW28 and PW27 by 1, and permits interruption by the interrupt signal INT2 from the CPU 2. Then, the CPU 1, in response to the interrupt signal INT2 from the CPU 2, transfers the preinformation data stored in the print work registers PW14 to the CPU 2 and then permits interruption by the interrupt signal INT1 from the CPU 2, as shown in FIG. 12. In response to the interrupt signal INT1 from the CPU 2, the CPU 1 executes the routine shown in FIGS. 11A and 11B. Since in this case the PR flag is set, the CPU 1 transfers the dot data stored in the print work register PW15, and decreases the data PL by 1. Also, since in this case the DF flag is reset, in STEP 26 dot data of the column "1" of the character data "j" is generated from the character generator 10 with the sum data (IAj+CA) of the inherent address data IAj corresponding to the character "j" stored in the print work registers PW8 and PW9 and the address data CA stored in the print work register PW28 as address data, and it is stored in the print work registers PW14 and PW15. Then, the contents of the print work registers PW28 and PW29 are increased by 1. A similar operation is subsequently executed, and when the column address data CA in the print work register PW28 is "11", i.e., when the last address of the character data "j" is designated, dot data is generated from the character generator 10 in STEP 25 in FIG. 11A. The CPU 1 then clears the print work register PW28 and sets DF flag. Therefore, when the routine shown in FIG. 11A is executed with subsequent generation of an interrupt signal INT1, the CPU 1 resets the DF flag, and calculates the first address of the character data "t" according to the preinformation data PRE1 to PRE4 and character data "t", thus generating corresponding dot data in the character generator 10 and storing the dot data in the print work registers PW14 and PW15. Subsequently, the CPU 1 increases the print length data PL by 1 and increases the contents of the print work registers PW28 and PW27 by 1 in each printing cycle in the manner as described above. When the content of the print work register PW28 thus becomes "11", continuously printed characters "j" and "t" as shown in FIG. 14 are obtained together with an underline printed by the pin P9. If it is detected that the print length data PL is "0", the CPU 1 sets the PE flag. Thus, it is detected in STEP 12 in FIG. 10 that the PE flag is set, thus stopping the printing routine.

Now, an operation in case of characters "j" and "t" in italic form according to the edited data as shown in FIG. 9 will be described. In this case, the same data is generated from the character generator 10 as the data generated therefrom according to the character data "j" and "t" shown in FIG. 8.

Figure 15A:
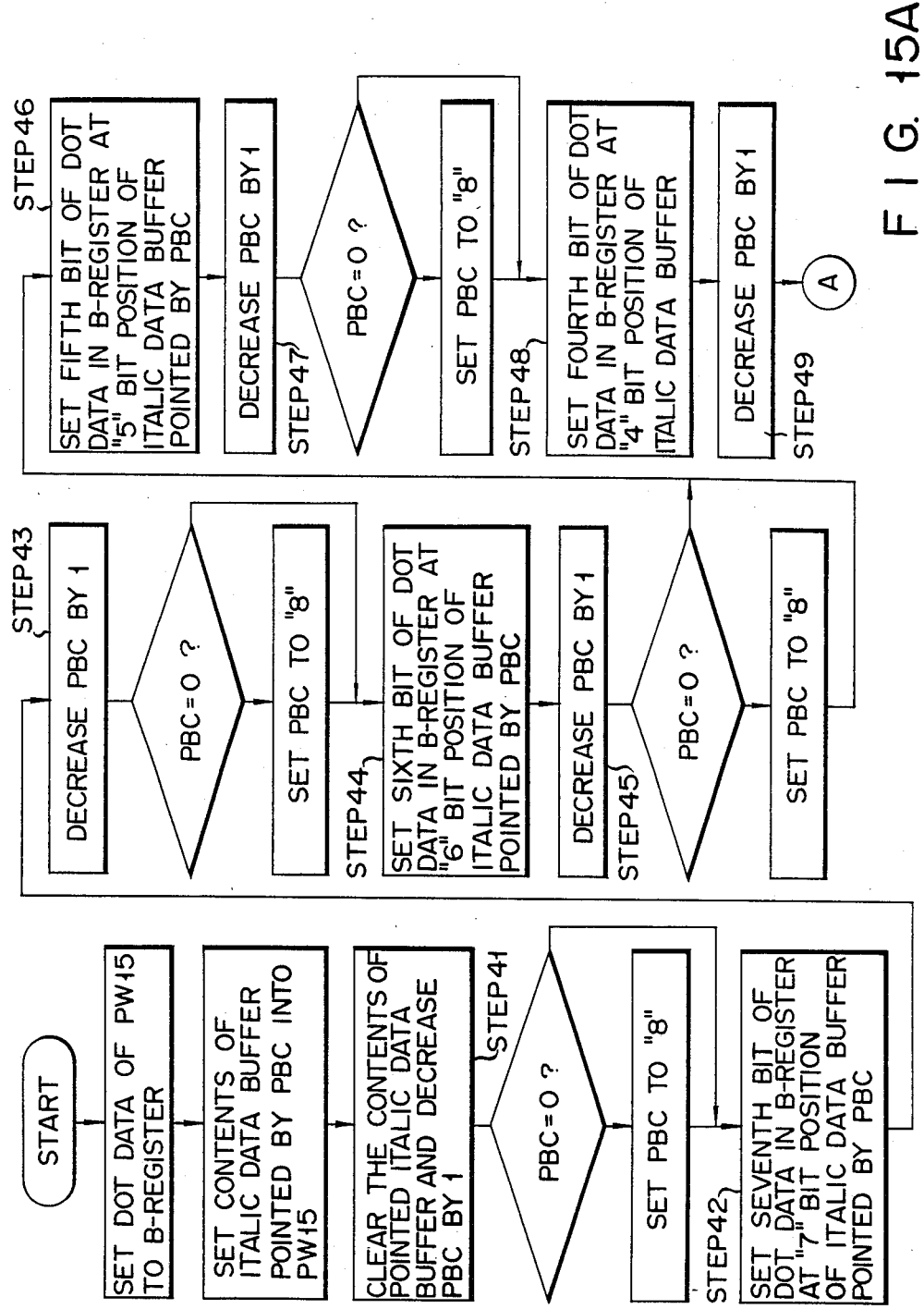
FIGS. 15A and 15B are flow charts illustrating an italic printing process.
Figure 15B:
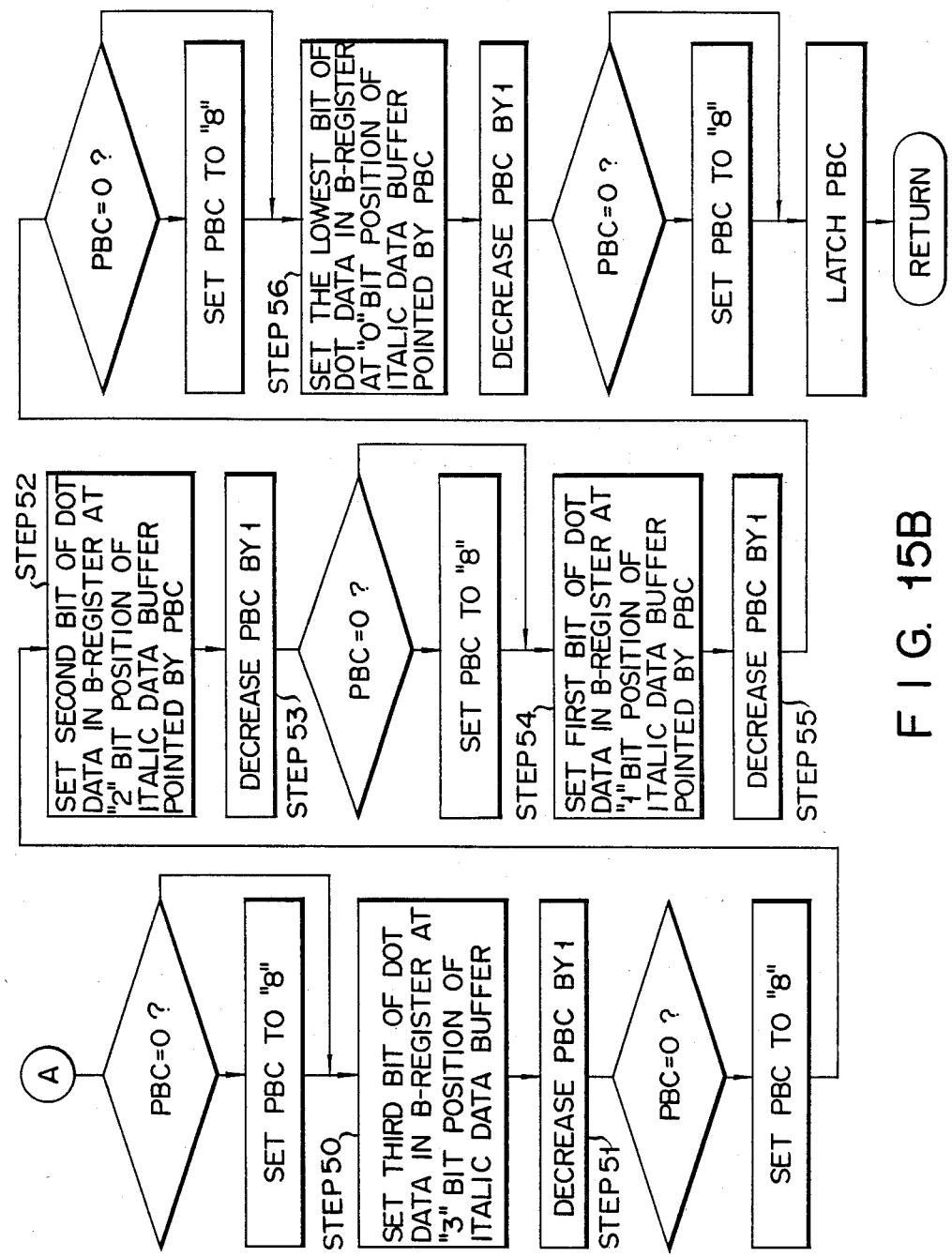
Figure 16:
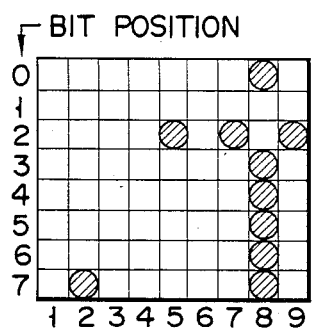
FIG. 16 is a view for explaining dot data corresponding to character "j" generated from a character generator.

When printing characters in the italic form, as in the case of printing ordinary characters, the CPU 1 generates dummy data and then causes the character generator 10 to generate dot data constituting the character data "j" (shown in FIG. 16) for each column. If it is detected in STEP 28, after each dot data has been read out, that printing in the italic form is required, the CPU 1 executes an italic form printing process as shown in FIGS. 15A and 15B.

Figure 18:
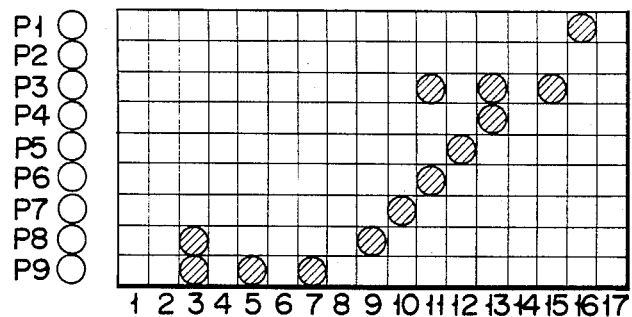
FIG. 18 is a view showing a character "j" printed in accordance with the flow chart shown in FIGS. 15A and 15B.

The CPU 1 first sets in a B-register thereof 8-bit dot data that has been generated from the first column address position of the character generator 10 and stored in the print work register PW15. The CPU 1 then sets the contents of the italic data buffer IDBi (i=0, ..., 9), designated by the point data stored in the pointer buffer PB, in the print work register PW15. In the first printing cycle, point data designating the italic data buffer IDB9 is stored in the pointer buffer PB, and also the italic data buffers IDB0 to IDB9 are all cleared, as shown in FIG. 10. Therefore, dot data "00000000" is stored in the print work register PW15 as shown in FIG. 17A. FIGS. 17B to 17J show 8-bit dot data representing the character "j" generated from the "1" to "9" column address positions of the character generator 10. In this case, the SP flag representing the printing of character "j" has been set in the print work register PW17. Since the content of the print work register PW28 is "j", the CPU 1 stores dot data "0" in the print work register PW14. The 9-bit data stored in the print work registers PW14 and PW15 thus obtained is transferred to the CPU 2 as shown in the flow charts of FIGS. 11A, 11B and 12, and printed in column position "1" as shown in FIG. 18. In subsequent STEP 41, the contents of the italic buffer register IDB9 are cleared, and the content PBC of the pointer buffer PB is decreased by 1. When the content PBC of the pointer buffer PB is "0", data "8" is set in the pointer buffer PB. If the data PBC is not "0", STEP 42 is immediately executed, in which the bit in the "7" bit position of the dot data in the B-register is set in the "7" bit position of the italic buffer IDB designated by the pointer buffer PB. In subsequent STEP 43, the content PBC of the pointer buffer PB is decreased by 1. In subsequent STEP 44, the bit in the "6" bit position of the dot data in the B-register is set in the "6" bit position of the data buffer, and is then set in the "6" bit position of the italic data buffer. Subsequently, STEPs 45, 47, 49, 51, 52 and 55 are repeatedly executed, whereby the bits in the "5", "4", "3", "2", "1" and "0" bit positions of the dot data in the B-register are set in the "5", "4", "3", "2", "1" and "0" bit positions of the italic data buffer successively designated by the pointer buffer PB while decreasing the content PBC in the point buffer PB by one in each cycle through STEPs 46, 48, 50, 52, 52, 54 and 56. When the content PBC of the pointer buffer PB is subsequently decreased by 1, the content PBC becomes "0", so that data "8" is set in the pointer buffer PB, thus terminating the italic printing process.

Figure 19A:
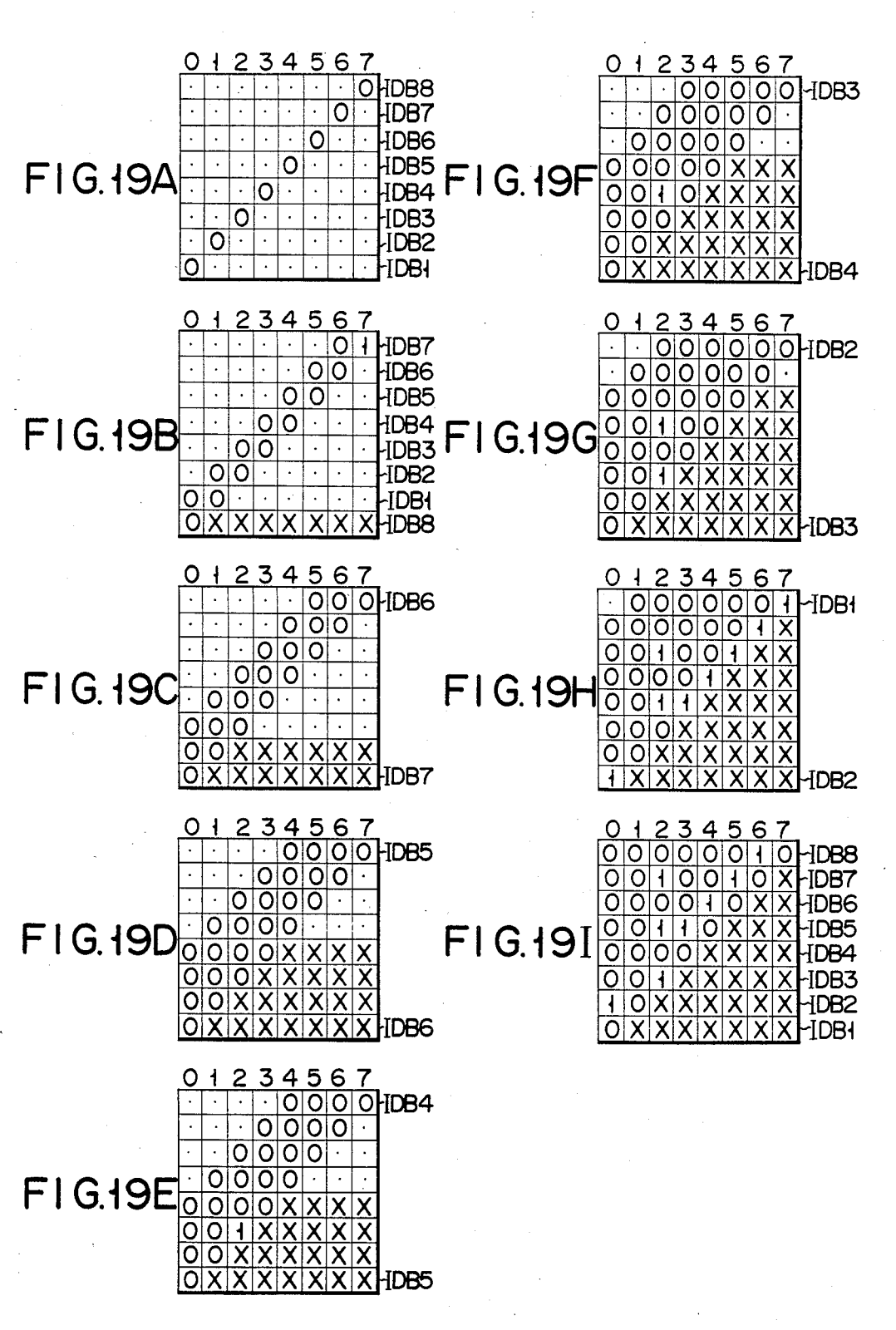

When the first italic printing cycle is ended, dot data as shown in FIG. 19A is stored in the italic data buffers IDB1 to IDB8. The mark "." shown in FIG. 19A represents "0" initially stored in the buffers IDB1 to IDB8. Subsequently, the routine shown in FIGS. 11A and 11B is executed, in which dot data in the print work registers PW14 and PW15 is transferred to the CPU 2 and printed, the dot data of the next column address is stored in the print work register PW19, and then the second italic printing cycle is executed according to the flow chart of FIGS. 15A and 15B. First, dot data that has been read out from the second column address position of the character generator 10 and stored in the print work register PW15 is stored in the B-register. Then, the content of the italic data buffer IDB8 designated by the content PBC "8" of the pointer buffer PB is stored in the print work register PW15. Then, in STEP 41, the content of the buffer IDB8 is cleared, and the content PBC of the pointer buffer PB is decreased by 1. Subsequently, STEPs 42 to 56 are executed, whereby data as shown in FIG. 19B is written in the italic data buffers IDB1 to IDB8. The mark "x" in FIG. 19B represents data "0" stored in the buffer IDB8 in the clear operation of STEP 41. In this case, the data PBC is "0" when STEP 55 ends, so that data "8" is written in the pointer buffer PB to designate the italic data buffer IDB8, and in step 56, data "0" in the "0" bit position of the dot data stored in the B-register is written in the "0" bit position of the buffer IDB8.

In the third italic printing cycle, the dot data shown in FIG. 17D, read out from the third column address position of the character generator 10, is stored in the B-register, and the content of the buffer IDB7 designated by the data PBC of "7" is stored in the register PW15. In subsequent STEP 41, the content of the buffer IDB7 is cleared, and the data PBC is decreased by 1. Then, STEPs 42 to 56 are executed. Thus, data as shown in FIG. 19C is written in italic data buffers IDB1 to IDB8.

After the third italic printing cycle, in the routine of FIGS. 11A and 11B, the CPU 1 detects that the SP flag is set in the print work register PW17, and the content of the print work register PW28 is "3", so that data "1" is set in the "3" bit position of the print work register PW14. Thus, 9-bit dot data of "000000011" is transferred from the CPU 1 to the CPU 2 and printed in the third column position as shown in FIG. 18.

Likewise, in the fourth to ninth italic printing cycles, dot data as shown in FIGS. 19C to 19I are stored in the buffers IDB1 to IDB8 according to the dot data shown in FIGS. 17E to 17J, and the contents of the buffers IDB6, IDB5, IDB4, IDB3, IDB2, IDB1 and IDB8 are transferred to the CPU 2 for each of these italic printing cycles, whereby the dot data is printed in the "5" to "10" column positions shown in FIG. 18.

After the CPU 1 detects that the dot data read out from the ninth column position of the character generator 10 has been processed in the manner as described above, it executes the tenth to sixteenth italic printing cycles to transfer the dot data stored in the italic buffers IDB7 to IDB1 obtained in the ninth italic printing cycle, as shown in FIG. 19, to the CPU 2 in each cycle while decreasing the contents PBC of the pointer buffer PB by 1 for each cycle. Thus, the data are printed in the "11" to "17" column address positions as shown in FIGS. 18.

Figure 20:
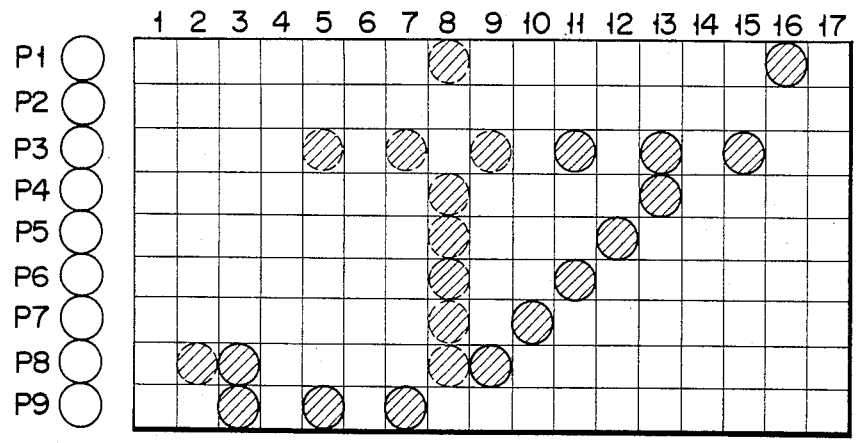
FIG. 20 is a view showing a printed example of an ordinary character "j" and an italic character "j"

FIG. 20 shows ordinary character "j" and italic character "j" in comparison with each other. In the figure, dashed circles show the ordinary character, and the solid circles show the italic character. As understood from FIG. 20, the bit data corresponding to the pin P9 is processed in the same way for italic printing and ordinary printing. The bit data corresponding to the pins P8 to P1, however, are printed in the case of italic printing after being delayed by one italic printing period (IP), two italic printing periods (2IP), three italic printing periods (3IP), four italic printing periods (4IP), five italic printing periods (5IP), six italic printing periods (6IP), seven italic printing periods (7IP) and eight italic printing periods (8IP) as compared to ordinary printing. In this embodiment, dot data representing the ordinary character is generated from the character 10 and bits included in this dot data are sequentially written in the respective italic data buffers IDB1 to IDB8 by cyclically designating these buffers IDB1 to IDB8, and then each bit of the dot data is read out with a different delay time. In this way, the printing of italic characters is made possible.

Figure 21A:
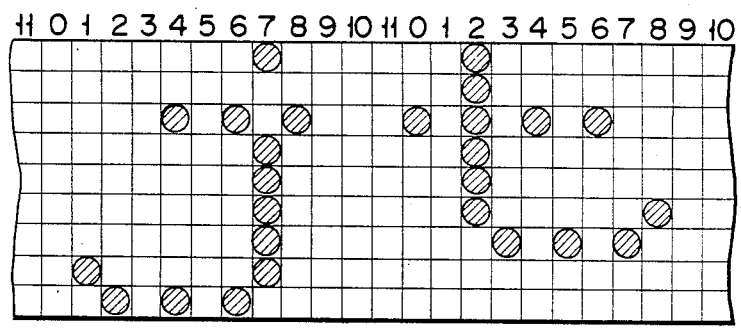
FIGS. 21A and 21B are views showing examples of ordinary characters "J" and "t" and italic characters "j" and "t"
Figure 21B:
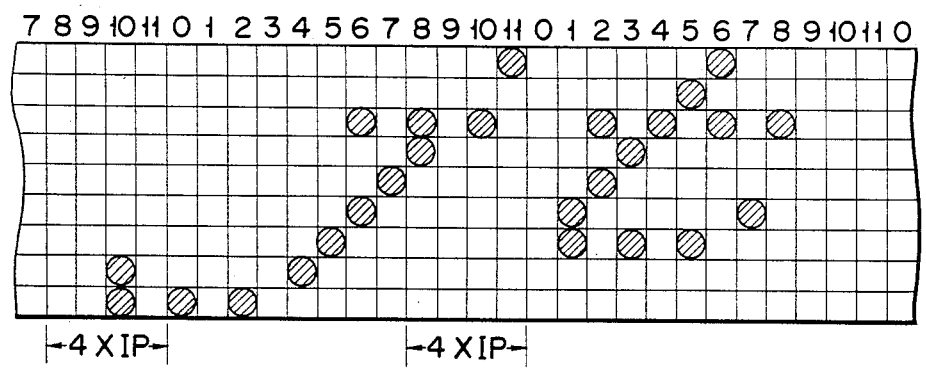

In this embodiment, the italic characters are printed in the "1" to "17" column positions. Therefore, if the print start position is set in the same manner as the case for the ordinary character, the center position of the printed italic character is deviated. Accordingly, when printing italic characters, the print start position is deviated to the left by 4IP as compared to the ordinary character, as shown in FIGS. 21A and 21B. To this end, for instance, the space length data is set to "0" when printing italic characters, while it is set to 4IP for printing ordinary characters.

Usually, italic characters are printed together with ordinary characters. In this case, a space for one character is provided before and after an italic character group.

While one embodiment of the invention has been described above, it is by no means a limitation. For example, the italic printing process shown in FIG. 11B may be replaced with the italic printing process shown in FIG. 22. In this case, a first inclination (IF1) flag area and a second inclination (IF2) flag area are provided in the RAM 4. The IF1 flag alone is set when executing a first italic printing process, like that shown in FIGS. 15A and 15B, the IF2 flag alone is set when executing a second italic printing process, and both the IF1 and IF2 flags are reset when executing a third printing process. These IF1 and IF2 flags are selectively set by, for instance, an inclination selection signal provided from the host computer 14 along with character data.

Further, when the first to third italic printing processes are executed according to the states of the IF1 and IF2 flags, a step of setting data designating data buffer IDB9, IDB5 or IDB4 into the pointer buffer PB, according to the states of the IF1 and IF2 flags, is executed in lieu of the step of setting data designating the data buffer IBD9 as shown in FIG. 10 into the pointer buffer PB. More specifically, when it is detected that the IF1 flag is set, data designating the data buffer IDB9 is set in the pointer buffer PB. If it is detected that the IF1 flag is set, data designating the data buffer IDB5 is set in the pointer buffer PB. If it is detected that both the IF1 and IF2 flags are reset, data designating the data buffer IDB4 is set in the pointer buffer PB.

FIGS. 23A to 23C respectively show dots obtained when 9-bit dot data of "111111111" stored in the print work registers PW14 and PW15 is printed by the pins P1 to P9 in the first, second and third italic printing processes. As apparent from FIG. 23A, in the first italic printing process, the dot printing by the pins P8 to p1 is executed with a delay time of 1 to 8 italic printing periods provided with respect to the dot printing by the pin P9. In the second italic printing process, dot printing by the pins P8 and P7, pins P6 and P5, pins P4 and P3 and pins P2 and P1 is executed with a delay time of 1 to 4 italic printing periods, provided with respect to dot printing by the pin P9, as shown in FIG. 23B. In the third italic printing process, dot printing by the pins P8 to P6, pins P5 to P3 and pins P2 and P1 is executed with a delay time corresponding to 1 to 3 italic printing periods, provided with respect to dot printing by the pin P9, as shown in FIG. 23C.

Figure 24:
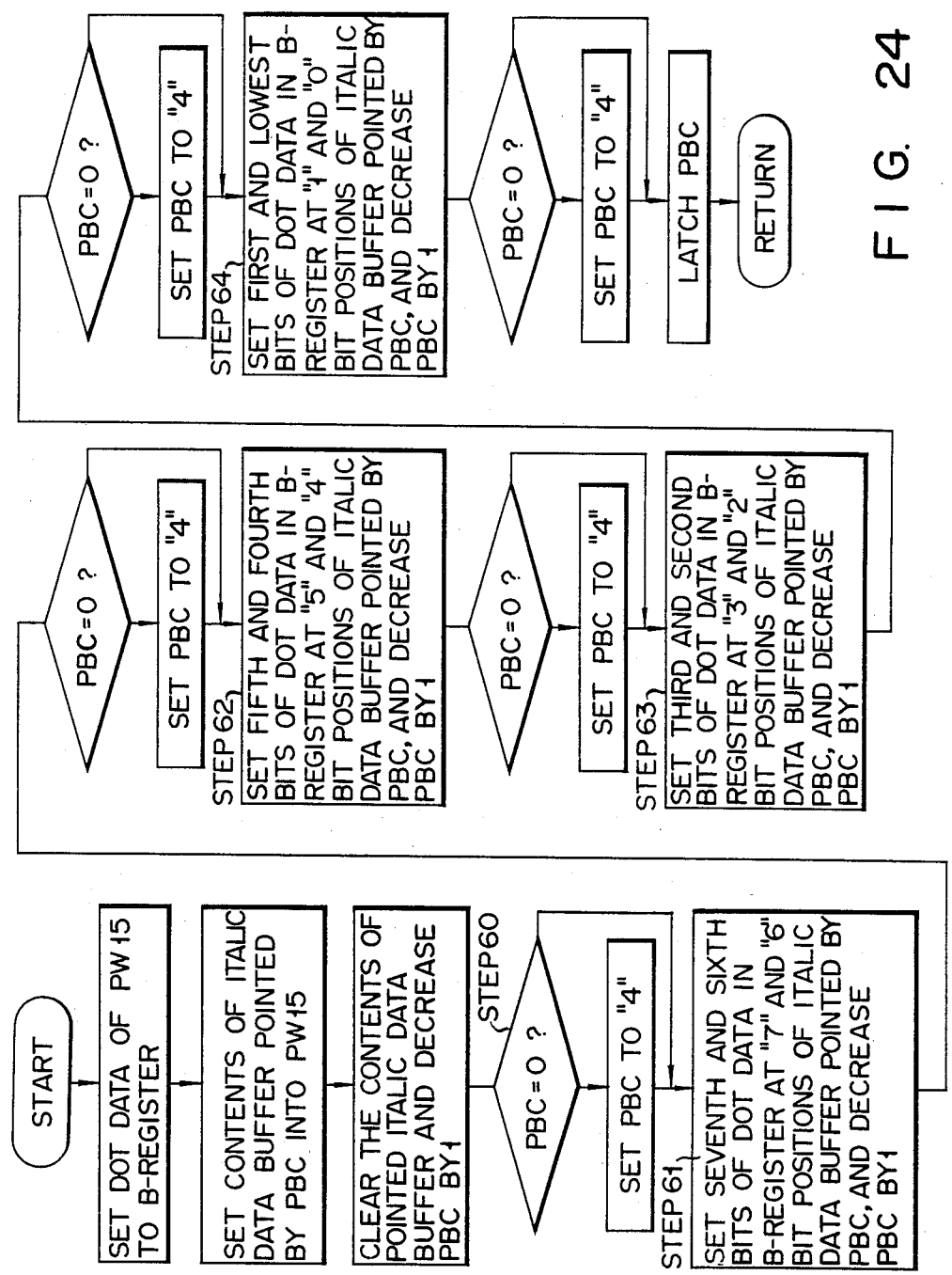
FIGS. 24 and 25 are flow charges illustrating second and third italics printing processes.

FIG. 24 shows the second italic printing process. In this process, like the first italic printing process shown in FIGS. 15A and 15B, the content of the italic data buffer designated by the content PBC of the pointer buffer PB is transferred to the register PW15 after the dot data of the print work register PW15 has been transferred to the B-register. Then, the content of the designated italic data buffer is cleared, and the data PBC is decreased by 1. Subsequently, STEP 60 is executed, in which a check is made as to whether the data PBC is "0". If it is detected that PBC=0, the data PBC is set to "4", and then STEP 61 is executed. In STEP 61, the seventh and sixth bits of the dot data in the B-register are set in the "7" and "6" bit positions of the italic data buffer designated by the data PBC, and then the data PBC is decreased by 1. Subsequently, the data PBC is set to "4" if PBC=0. Likewise, STEPs 62, 63 and 64 are executed, and the data PBC is set to "4" if PBC=0.

In STEP 62, the fifth and fourth bits of the dot data in the B-register are set in the "5" and "4" bit positions of the italic data buffer designated by the data PBC, and the data PBC is decreased by 1. In STEP 63, the third and second bits of the dot data in the B-register are set in the "3" and "2" bit positions of the italic data buffer designated by the data PBC, and the data PBC is decreased by 1. In STEP 64, the first bit and lowest bit of the dot data in the B-register are set in the "1" and "0" bit positions of the italic data buffer designated by the data PBC, and the data PBC is decreased by 1. Subsequently, the data PBC is latched to complete one printing cycle of the second italic printing process.

Figure 25:
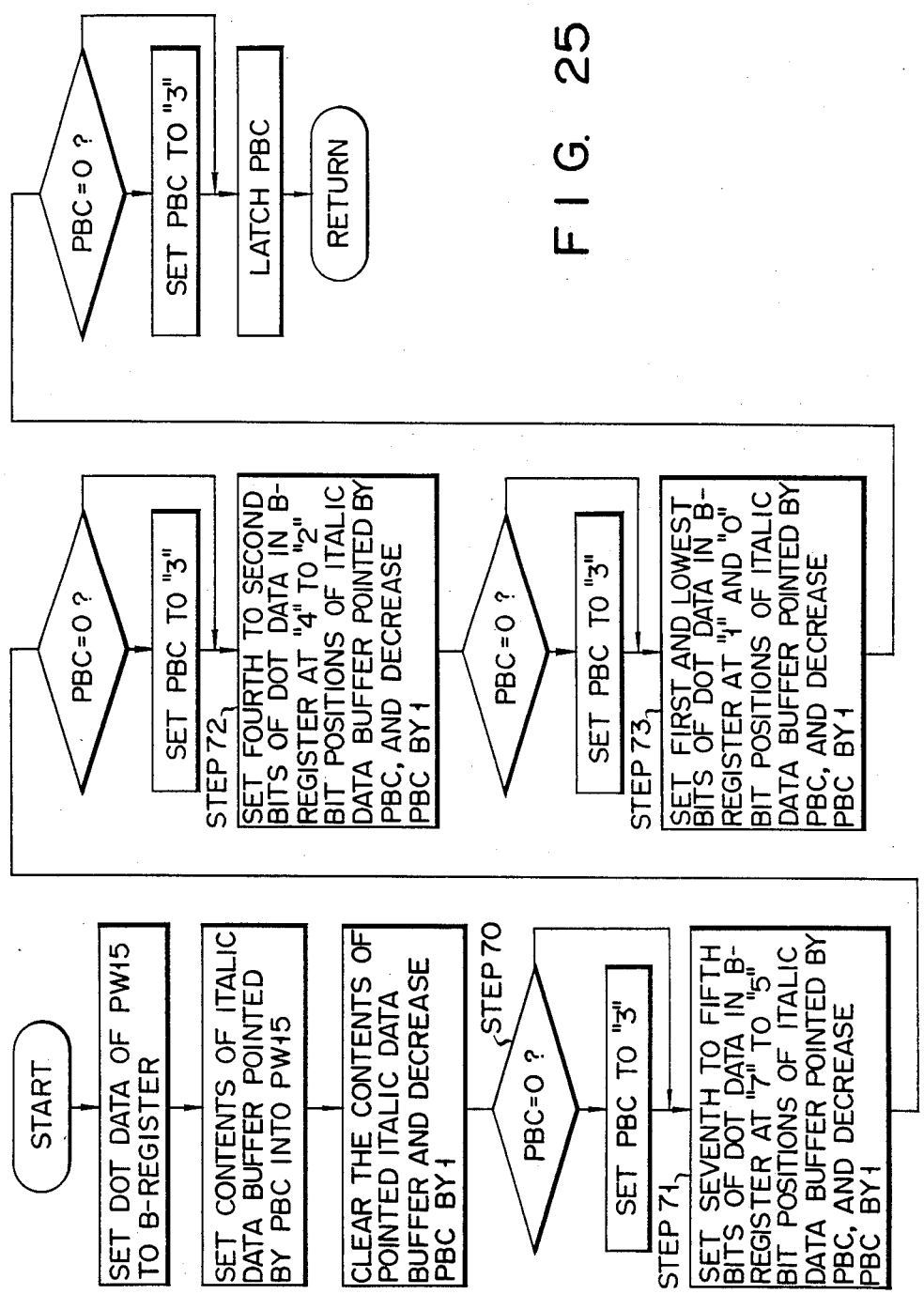

FIG. 25 illustrates the third italic printing process. In this process, unlike the second italic printing process shown in FIG. 24, STEP 70 is executed in lieu of STEP 60. If it is detected in STEP 70 that PBC=0, the CPU sets the data PBC to "3", and then STEP 71 is immediately executed. If it is detected that PBC≠0, STEP 71 is executed immediately. In STEP 71, the seventh to fifth bits of dot data stored in the B-register are set in the "7" to "5" bit positions of the italic data buffer designated by the data PBC. Subsequently, if it is detected that PBC=0, the data PBC is set to "3", and the data PBC is reduced by 1. Likewise STEPs 72 and 73 are executed, and then if PBC=0, the data PBC is set to "3".

In STEP 72, the fourth to second bits of dot data in the B-register are set in the "4" to "2" bit positions of the italic data buffer designated by the data PBC, and then the data PBC is decreased by 1. In STEP 73, the first bit and lowest bit of the dot data in the B-register are set in the "1" and "0" bit positions of the italic data buffer designated by the data PBC, and then the data PBC is decreased by 1. Subsequently, the data PBC is latched, thus completing one printing cycle of the third italic printing process.

Now, a case will be described in which character "j" is printed in the italic form according to the edited data shown in FIG. 9 when the IF2 flag is set. Again in this case, an operation similar to that described before with reference to FIGS. 10, 11A and 11B is executed. When it is detected in STEP 28 shown in FIG. 11B that there is a request for italic form printing, it is subsequently detected that the IF2 flag is set as shown in FIG. 22, whereby the second italic printing process is executed. Again in the second italic printing process, 8-bit data as shown in FIGS. 17A to 17J, which has been stored in the print work register PW15 at the time of the start of the initialization printing cycle and first to ninth printing cycles, is stored in the B-register. In this case, the dot data shown in FIGS. 17B to 17J again corresponds to the dot data read out from the column address positions "1" to "9" of the character generator 10.

Figures 26, 27A, 27B, 27C, 27D, 27E, 27F, 27G, 27H, 27I:
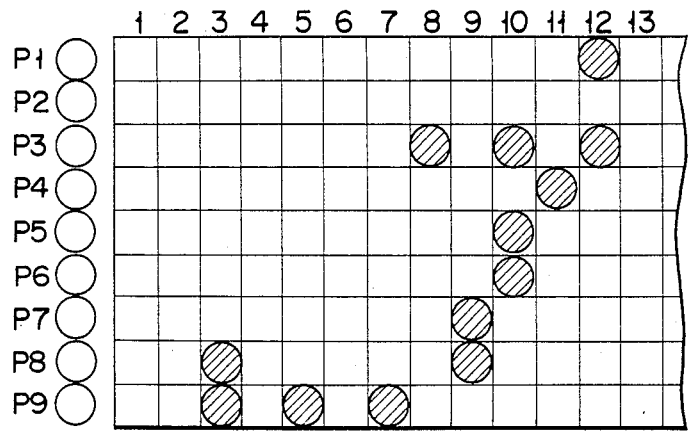
FIG. 26 is a view showing an example of print of character "j" printed according to a second italic printing process.
FIGS. 27A to 27I are views showing dot data stored in the B-register in each printing cycle when executing the second italic printing process.

The 8-bit dot data stored in the B-register in the initialization printing cycle is printed in the first column position by the pins P1 to P9 as shown in FIG. 26. In this case, data "0" that has been stored in the register PW14 is printed by the pins. Then, in the first printing cycle, the seventh and sixth bits of "0", fifth and fourth bits of "0", third and second bits of "0" and first bit and lowest bit of "0" are stored in the "7" and "6" bit positions of the data buffer IDB4, "5" and "4" bit positions of the data buffer IDB3, "3" and "2" bit positions of the data buffer IDB2, and "1" and "0" bit positions of the data buffer IDB1, as shown in FIG. 27A, through STEPs 61 to 64 in FIG. 24. Thus, data "00000000" thus stored in the data buffer IDB4 is printed in the second column position, as shown in FIG. 26, by the pins P1 to P9.

Likewise, dot data is printed in the italic data buffers IDB1 to IDB4, as shown in FIGS. 27B to 27I, according to dot data shown in FIGS. 17C to 17J in the second to ninth printing cycles. The data buffers IDB3, IDB2, IDB1, IDB4, IDB3, IDB2, IDB1 and IDB4 obtained in the second to ninth printing cycles are printed in the third to tenth column positions as shown in FIG. 26. Then, two further printing cycles are similarly executed. In this case, dummy data of "00000000" is generated from the character generator 10. In this way, data stored in the data buffers IDB3 and IDB2 shown in FIG. 27I are sequentially taken out and printed in the eleventh and twelfth column positions shown in FIG. 26.

Again in this case, identical character data is read out from the character generator 10 irrespective of whether the printing is done by italic printing or ordinary character printing. In the case of italic printing, each 8-bit dot data of the character data read out is delayed by a predetermined different delay time. The average value of the different delay times in the second italic printing process is shorter than the average value of different delay times set in the first italic printing process, and is longer than the average value of different delay times used in the third italic printing process. Thus, in the first and third italic printing processes, the angle of the italic character, with respect to the character obtained by ordinary character printing, is respectively greater and smaller than the angle of the italic character obtained in the second italic printing process.

It is also possible to use a single CPU of a large capacity and of a high speed in lieu of the CPUs 1 and 2 and latch circuit 9 shown in the data processing circuit shown in FIG. 1. Further, in place of the head pins P1 to P9, it is possible to use thermal head pins or ink jet elements.

What is claimed is:

1. A dot printing device, comprising:
   a head having N dot printing elements arranged in a row;
   head driving means for selectively energizing said dot printing elements according to dot data; and
   data processing means for supplying a plurality of dot data constituting character data designated by input character designation data, while generating a plurality of dot data constituting character data designated by input character designation data, each dot data setting the operating state of each of said N dot printing elements to said head driving means for each printing cycle in an ordinary printing mode, dividing N bits constituting each of said dot data into n (n≦N) bit-groups, and for supplying said n bit-groups sequentially to said head driving means in n successive cycles in an italic printing mode;
   said data processing means causing a deviation in a print start position in the italic printing mode in a direction opposite to the printing direction by a distance corresponding to a predetermined non-zero number of dots in comparison with the print start position in the ordinary printing mode.

2. The dot printing device according to claim 1, wherein n is set equal to N.

3. The dot printing device according to claim 2, wherein said data processing means includes:
   character generating means;
   memory means having first and second memory areas; and
   a data processing unit for storing in said second memory area (N−1)-bit dot data which is generated from said character generating means according to said input character designation data, storing one-bit dot data determined according to the input data in said first memory area, supplying said one-bit dot data stored in said first memory area to said head driving means in a printing cycle and then supplying n bit-groups stored in said second memory area to said head driving means in n successive printing cycles.

4. The dot printing device according to claim 1, wherein said data processing means includes:
   character generating means;
   memory means having first and second memory areas; and
   a data processing unit for storing in said second memory area (N−1)-bit dot data generated from said character generating means according to said input character designation data, storing one-bit dot data determined according to the input data in said first memory area, supplying said one-bit dot data to said head driving means in a printing cycle and then supplying n bit-groups stored in said second memory area to said head driving means in successive printing cycles.

5. A dot printing device, comprising:
   a head having N dot printing elements arranged in a row;
   head driving means for selectively energizing said dot printing elements according to dot data; and
   data processing means for supplying a plurality of dot data constituting character data designated by input character designation data to said head driving means for each printing cycle in an ordinary printing mode, while generating a plurality of dot data constituting character data designated by input character designation data, each dot data setting the operating state of each of said N dot printing elements, dividing N bits constituting each of said dot data into n (n≦N) bit-groups determined according to inclination selection data, and for supplying said n bit-groups sequentially to said head driving means in n successive cycles in an italic printing mode;
   said data processing means causing a deviation in a print start position in the italic printing mode in a direction opposite to the printing direction by a distance corresponding to a predetermined non-zero number of dots in comparison with the print start position in the ordinary printing mode.

6. The dot printing device according to claim 5, wherein said data processing means includes:
   character generating means;
   memory means having first and second memory areas; and
   a data processing unit for storing in said second memory area (N−1)-bit dot data generated from said character generating means according to said input character designation data, storing one-bit dot data determined according to the input data in said first memory area, and supplying said one-bit dot data to said head driving means in a printing cycle and then supplying n bit-groups stored in said second memory area to said head driving means in n successive printing cycles.

* * * * *